United States Patent [19]

Steiner et al.

[11] Patent Number: 5,498,445
[45] Date of Patent: Mar. 12, 1996

[54] MANUFACTURING PROCESS FOR GROOVED SUBSTRATES AND MULTILAYER STRUCTURE

[75] Inventors: Werner Steiner, Boeblingen; Gerhard Trippel, Sindelfingen, both of Germany

[73] Assignee: International Business Machines Inc., Armonk, N.Y.

[21] Appl. No.: 311,296

[22] Filed: Sep. 23, 1994

Related U.S. Application Data

[62] Division of Ser. No. 152,262, Nov. 12, 1993, abandoned, which is a continuation of Ser. No. 745,037, Aug. 14, 1991, abandoned.

[30] Foreign Application Priority Data

Aug. 17, 1990 [EP] European Pat. Off. ............ 9011578.6

[51] Int. Cl.$^6$ ........................................ B05D 5/06
[52] U.S. Cl. ............... 427/162; 427/240; 427/355; 427/387
[58] Field of Search ..................... 427/387, 355, 427/240, 162

[56] References Cited

U.S. PATENT DOCUMENTS

| | | | |
|---|---|---|---|
| 4,713,314 | 12/1987 | Namba et al. | 430/270 |
| 4,800,112 | 1/1989 | Kano et al. | 428/163 |
| 4,801,499 | 1/1989 | Aoyama et al. | 428/336 |
| 4,810,547 | 3/1989 | Minami et al. | 428/65 |
| 5,156,941 | 10/1992 | Fujita et al. | 427/162 |
| 5,188,863 | 2/1993 | de Graat | 427/162 |

FOREIGN PATENT DOCUMENTS 0296888  12/1988  European Pat. Off. .

Primary Examiner—Janyce Bell
Attorney, Agent, or Firm—Douglas R. Millett

[57] ABSTRACT

Grooved substrates and multilayer structures, especially suitable for optical disks, are taught. The major process steps include spin coating of a supporting plate with dissolved material forming a soft layer thereon, stamping grooves into the soft layer to form a structured soft layer showing the negative image of the stamp and hardening the structured soft layer by thermal treatment. The dissolved material contains polymeric organometal compounds comprising polymer siloxane and/or polymer silicates. In one embodiment the structured soft layer is a dielectric layer containing various combinations of the oxides $SiO_2$, $La_2O_3$, $PbO$ and $TiO_2$. The multilayer structure completed by a magneto-optic layer, a reflector layer and a passivation layer.

15 Claims, 5 Drawing Sheets

FRESHLY PRESSED

ADDITIONALLY PREBAKED AND CURED

1

MANUFACTURING PROCESS FOR GROOVED SUBSTRATES AND MULTILAYER STRUCTURE

This application is a divisional application under 37 CFR 1.60 of prior application Ser. No. 08/152,262, filed on Nov. 12, 1993, now abandoned, which is a continuation of Ser. No. 07/745,037, filed on Aug. 14, 1991, now abandoned.

BACKGROUND OF THE INVENTION

1. Field of the Invention

The present invention relates generally to a process for manufacturing a grooved substrate and to a multilayer structure and more particularly to a grooved substrate and multilayer structure especially suitable for optical disks.

2. Description of the Prior Art

Microstructuring of thin dielectric layers or processes for manufacturing grooved substrates are needed in the whole data processing technology. Applications are to be found not only in the semiconductor and packaging technology but also in integrated optics technology, in the storage technology, e.g. for data communications, for magnetic disks and especially for optical disks. The high storage density of optical disks is achieved by using beam diameters of approximately 1 μm. The information is recorded at a predetermined position and read out from a predetermined position Therefore the beam position needs to be accurately controlled by the use of guide addresses or guide signals. These typically are microscopic grooves, which in conjunction with a sensing mechanism and a servo system operating upon the optical beam serve to guide the beam in the correct direction during recording and reading operations. Various methods for forming the grooves on the optical disk have been proposed.

PCT/EP88/00479 describes a hot stamping process for forming the tracking grooves directly in the glass surface of an optical disk. According to this method the glass substrate is heated in excess of the softening point of the glass types used, typically higher than 600° C. The temperature of the heated stamp should preferably be lower than the transformation temperature of the glass type used, typically 380°–450° C. The microstructure on the heated stamper deforms the surface of the glass substrate resulting in a corresponding microstructure on the surface of the glass substrate, which, when separated from the stamper and cooled in a controlled manner, gives the desired surface microstructure on the glass substrate. Microstructures formed on the surface of the glass substrate using the hot stamping process as described above conform to the microstructure on the stamper across the area of the substrate surface, but, for example, the glass may flow into a deep groove in the stamper to give a shallow protrusion on the substrate surface. Since for reasons of economy and product cost reduction it is desired to re-use the stamper a number of times the hot stamping process needs the selection of appropriate stamping conditions and coating materials for the glass layer to enable a single stamper to be used repeatedly without sticking problems. The high temperatures applied to the glass substrate during hot stamping processes, e.g. higher than 600° C., may cause the deformation of the glass substrate.

The method for manufacturing substrates having a large number of fine grooves thereon as described in U.S. Pat. No. 4,810,547 comprises applying a solution containing at least one organometal compound and a thickening agent onto a body of substrate to form a film having plasticity, impressing in the surface of the film formed on the substrate with a mold and calcining the film to solidify the same. A similar method is claimed in the unexamined Japanese patent application JP 62-102445.

These methods provide advantages in that the resulting film has a shrinkage lower than that of gel films as for example used in PCT/GB88/01080 and seldom causes cracks and/or warpage due to nonuniform drying rate since the organometal compound is formed in a film on the substrate body.

When used for optical disks grooved substrates and structures should have a high refractive index and a high signal to noise ratio in addition to the already mentioned properties. This normally is achieved by producing a multilayer structure on a grooved substrate, as described by Takahashi, et al. in "High Quality Magneto-Optical Disk", SPIE Vol. 695 Optical Mass Data Storage II (1986).

There has been a strong need for substrates with fine grooves, especially for optical disks, which do not show the various disadvantages aforementioned and which, on the contrary, have an extremely high dimensional stability and reliability as well as a high productivity in their manufacturing process.

SUMMARY OF THE INVENTION

It is a principal object of tile present invention to provide a new grooved substrate with extremely high dimensional stability, sharp edges of the grooves and exact transfer of the stamper image to the substrate.

Another major object of the present invention is to enhance the refractive index and the signal to noise ratio of the grooved substrate especially when used for optical disks.

It is another object of the present invention to avoid blisters or cracks in the grooved film.

A further object of the present invention is to provide a manufacturing process which ensures the re-use of the stamper and which is quite simple and economic.

The above mentioned and other objects of the present invention are achieved by providing a multilayer structure comprising a substrate with plane, unstructured surfaces a structured glass-like layer provided on one surface of said substrate, wherein said glass-like layer contains grooves in the layer surface not adjacent to said substrate, a dielectric layer disposed on said structured glass-like layer, a magneto-optic layer disposed on said dielectric layer, a reflector layer disposed on said magneto-optic layer and a passivation layer disposed on said reflector layer, wherein said dielectric layer, said magneto-optic layer, said reflector layer and possibly said passivation layer contain the grooves of said structured glass-like layer.

This multilayer structure and other grooved substrates may be manufactured according to a process comprising the steps of spin coating of a supporting plate with dissolved material, forming a soft layer on said supporting plate, stamping grooves into said soft layer with a stamp, wherein said stamp shows the negative image of the structure to be transmitted to said soft layer thus forming a structured soft layer, hardening of said structured soft layer to transform said structured soft layer into a hard, structured layer, wherein said hardening is accomplished by thermal treatment, wherein said dissolved material contains at least one polymeric organometal compound.

For a fuller understanding of the nature and advantages of the present invention reference should be made to the following detailed description taken in conjunction with the accompanying drawings.

DESCRIPTION OF THE PREFERRED EMBODIMENTS

Figure 1A:
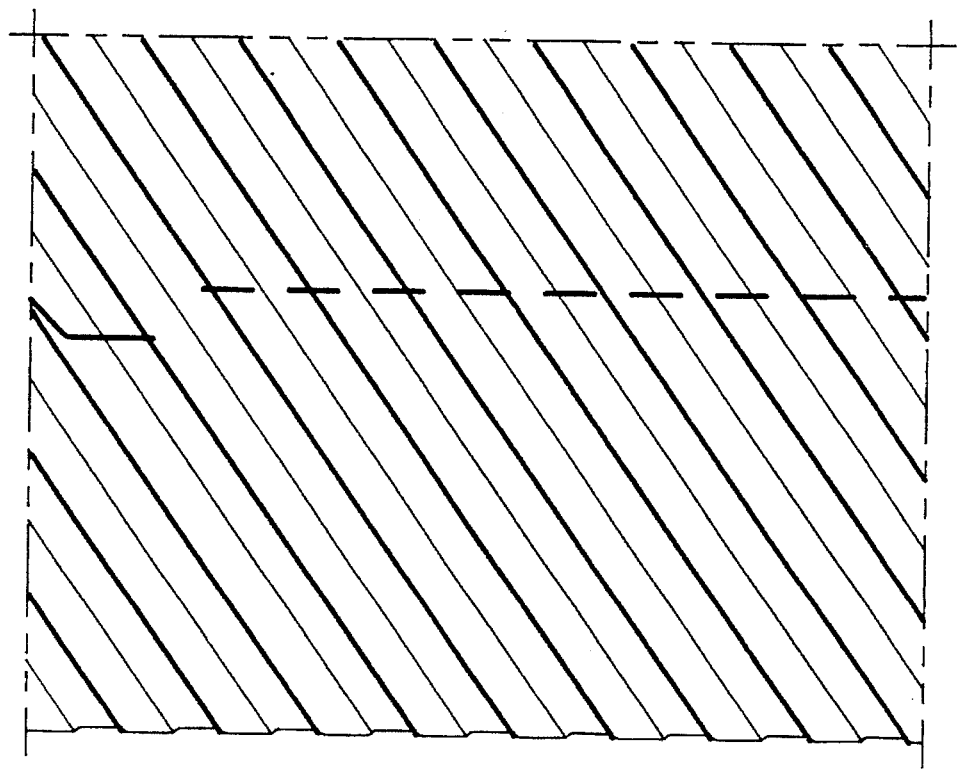
FIG. 1A shows a part of the surface of an embodiment of a grooved substrate with a magnification factor of 5000.
Figure 1B:
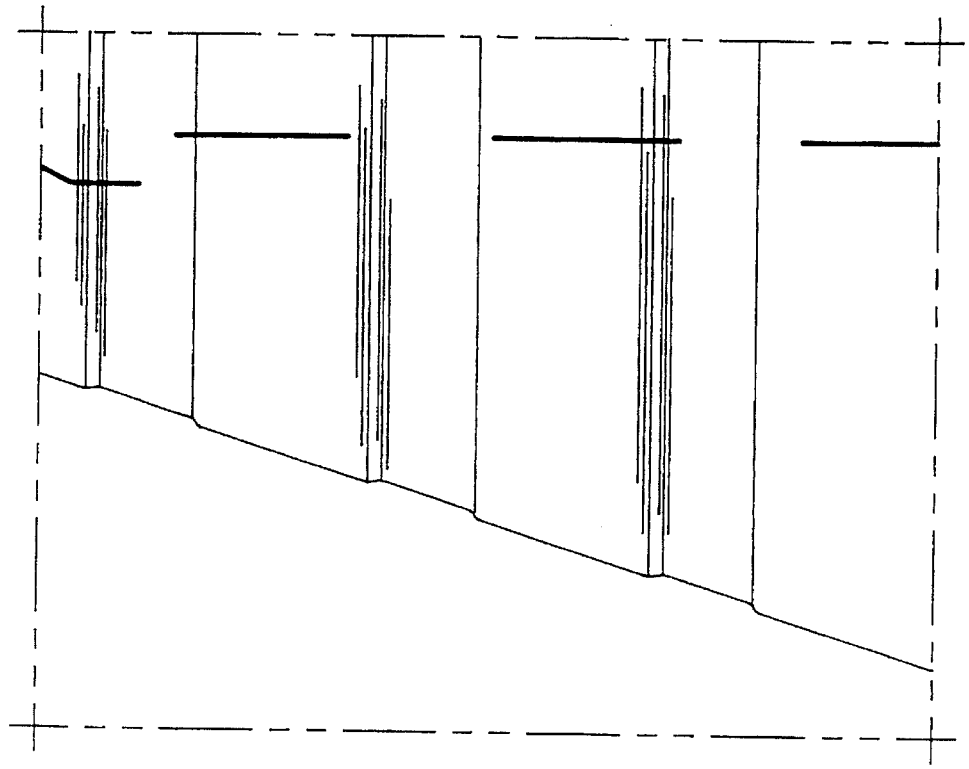
FIG. 1B shows a part of the surface of the same embodiment; due to a magnification factor of 20.000 the fine grooves with their sharp edges may be seen.

Referring now to FIGS. 1A and 1B the surface of a grooved substrate with stamped fine grooves of 1 μm in width and 70 nm in depth with their sharp edges are clearly to be seen. To produce a substrate with fine grooves a supporting plate is spin-coated with dissolved material forming a soft layer on the supporting plate. The dissolved material contains controlling compounds and polymeric organometal compounds. The controlling compounds control the viscosity of the layer during the following process steps. The spin-on time, the number of revolutions per minute during the spin-on step, the transportation time to the stamp and the time delay until the stamping step is carried out are to be adjusted carefully. The controlling compounds comprise ethylene glycol. Grooves are stamped in the soft layer with a stamp showing the negative image of the structure to be transmitted to the soft layer. By thermal treatment the structured layer is hardened and transformed into a hard structured layer. In accordance with the invention the polymeric organometal compounds comprise polymer siloxane [RxSiOy]n or silsesquioxane, polymeric titanate [TiO2]n and polymer silicates [SiO2]n like phosphosilicates or phosphosiloxane. These materials consist of long molecule chains containing reactive silanol groups with a high silicon portion. During the hardening step the soft structured layer is transformed into a hard, SiO$_2$-like layer. This transformation takes place accompanied by volume reduction due to polycondensation and thermodegradation effects:

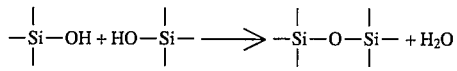

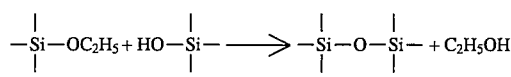

Typical condensation reaction

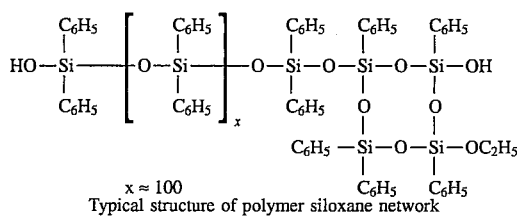

$x \approx 100$

Typical structure of polymer siloxane network

The use of dissolved material containing already polymerized organometal compounds with a high Si content decreases the volume reduction considerably. This effect may be intensified by lowering the portion of solvent in the controlling compounds. By carefully choosing the amount of solvent the drying speed of the spun-on dissolved material is controlled. A high moisture content of the soft layer to be structurized will cause the destruction of the grooved structure during the separation of the stamp. Using an ethylene glycol portion of about 30% results in a drying speed reduction without affecting the accurateness of the replication. Similar solvents like glycerine also reduce the drying speed but cause micro bubbles in the structured layer leading to poorly defined edges.

With a thermo gravimetric analysis information about the weight loss of the organometal compounds during the hardening step may be obtained. The weight loss depends on the hardening temperature and the atmosphere. ACCUGLASS 204 (trademark of Allied-Signal Inc., Milpitas, Calif.), containing polymer siloxane as organometal compound, shows a continuous weight loss in the temperature range from 50° C. to about 480° C. In air the weight loss is as small as about 13% and in nitrogen atmosphere it is even lower with about 7%. Very low weight losses are shown by ACCUGLASS x11 series with 5% (+/−1%).

Thus the process as claimed leads to less volume shrinkage and thus higher exactness in accepting and keeping the form of the stamp, resulting in grooved substrates with extremely high dimensional stability, sharp edges of the grooves and exact transfer of the stamper image to the substrate, avoiding blisters or cracks in the grooved film.

The stamping is carded out at room temperature and at low stamping pressure, preferably at about 1 to 6 bar in an isobaric press. These conditions avoid breakage of the stamper plate by foreign particles and the deformation of the microstructure of the stamper. The stamp is preferably coated with a thin carbon layer of preferably about 0.4 μm to prevent it from sticking to the structured soft layer. Other coating materials tested like silicon, siliconoxide, siliconnitride, nickel or tungsten lead to a close sticking of the stamp to the structured soft layer. The typical adhesion shown by the plane and parallel surfaces of the stamp and the structured layer in intimate contact after the stamping step may be overcome by a special treatment without applying external forces. Heating up the stamp to about 130° C. assures the uniform detachment of the stamp and the integrity of the grooved structures as well as of the stamp itself. During this thermal treatment small amounts of solvent of the structured layer evaporize forming a sort of gaseous bolster between the coated stamp and the structured layer. This detachment mechanism is supported by the different thermal expansion coefficients of the coated stamp and the structured layer. Thus after, if necessary, a simple cleaning procedure the stamp may be reused leading to a considerable reduction of the manufacturing costs.

To achieve grooves of 1 μm in width and 70 nm in depth a mixture of 1 g ethylene glycole and 30 g Accuglas 204 is spun on the cleaned glass substrate within 10 s at 1500 rpm. At a stamping pressure of about 6 bar the desired structure is stamped into the spun-on layer with a carbon coated stamp within 3 minutes. Then the structured layer and the stamp adhering to it are heated up to about 130° C. After approximately 4 to 5 minutes the stamp detaches from the grooved substrate more or less automatically, it pops up, without applying external forces. The thermal treatment of about 400° C. during about 1 hour transforms the structured soft layer into a hard, transparent layer showing good adhesion to the glass substrate underneath. In another experiment a mixture of 1 g ethylene glycole and 30 g ACCUGLASS 310 is spun on the glass substrate within 70 s at 1500 rpm and stamping is carried out at a stamping pressure of 3 bar within 2.5 minutes. Excellent results were obtained showing very fine grooves in the hardened structured layer with widths of 0.4 μm and below.

Figure 1C:
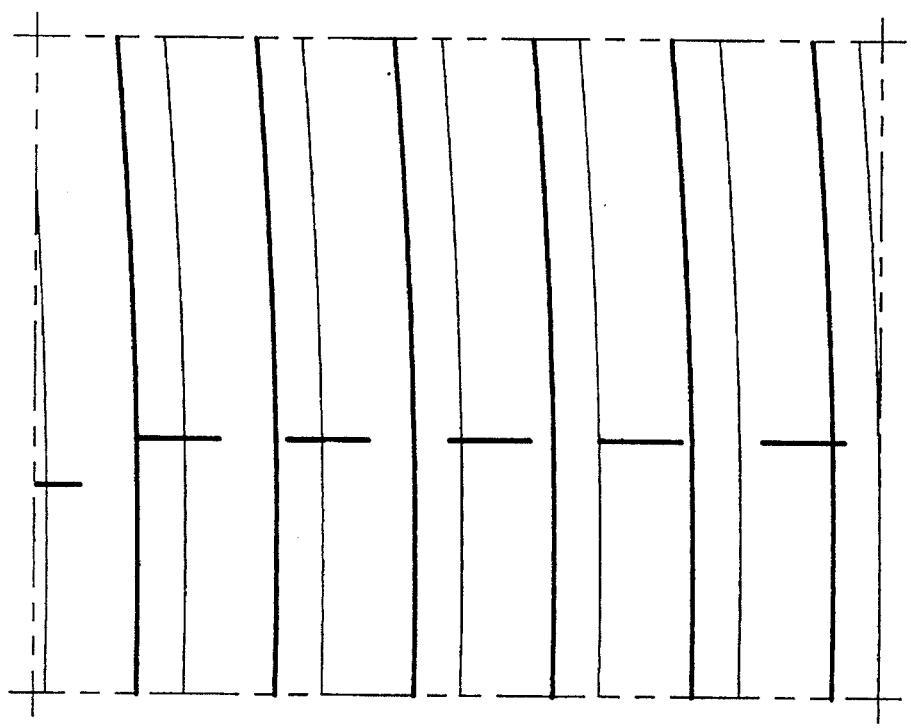
FIG. 1C shows a part of the surface of an embodiment with a magnification factor of 10.000.
Figure 1D:
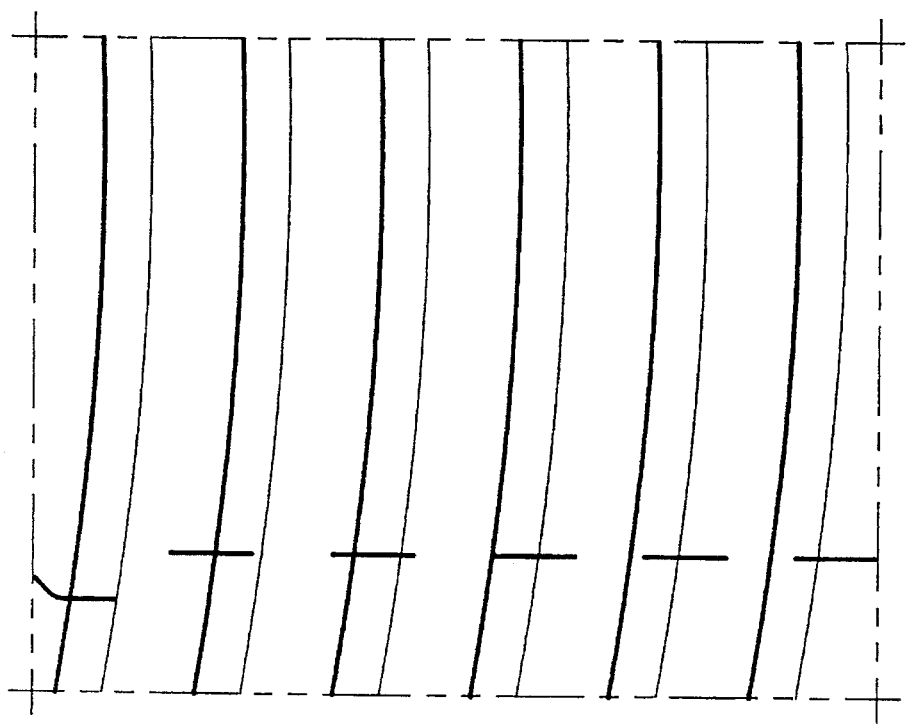
FIG. 1D shows a part of the surface of an embodiment which has been treated with a prebake and curve steps with a magnification factor of 10.000.

FIG. 1C and FIG. 1D both show a part of the surface of an embodiment. In FIG. 1C the grooves have been stamped after air drying of the spun-on soft layer. In FIG. 1D a prebake and cure step were applied to the soft layer after the stamping step. There can be seen no difference in the sharpness of the grooves of FIG. 1C and FIG. 1D. Due to the high Si content in the polymerized organometal compounds of the dissolved material forming the soft layer this layer already shows a high dimensional stability before the thermal treatment of the hardening step. The volume shrinkage of the structured soft layer thus is low and this leads to a high exactness of the stamper image shown by the grooved film.

Figure 2:
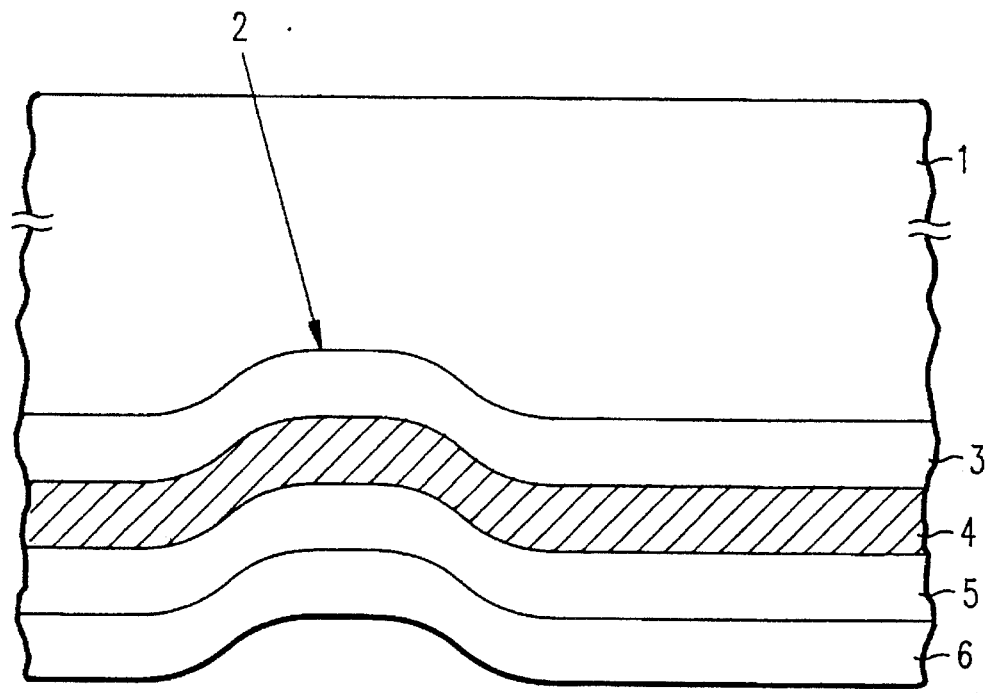
FIG. 2 is a schematic diagram showing the cross-section of a state of the art grooved structure for optical disks.

FIG. 2 is a schematic diagram showing the cross-section of a state of the art grooved structure for optical disks. The grooves 2 are provided in the substrate 1 itself and the layers forming the complete structure are disposed on the grooved substrate. These four layers consist of a dielectric layer 3 of about 50 nm, thickness, a magneto-optic layer 4 of about 35 nm thickness, a reflector layer 5 of about 60 nm thickness and a passivation layer 6 of about 100 nm thickness.

Figure 3A:
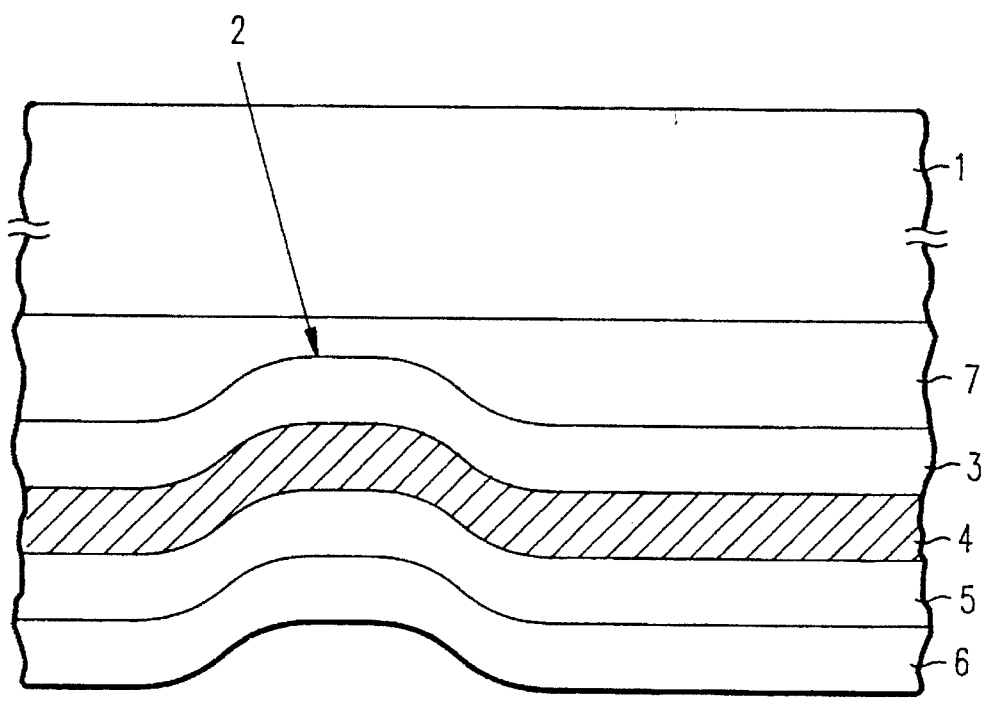
FIG. 3A is a schematic diagram showing the cross-section of one embodiment of the present invention.

FIG. 3A is a schematic diagram showing the cross-section of one embodiment of the present invention. In this embodiment a silicon dioxide layer 7 is disposed on the plane surface of the unstructured substrate 1 and the grooves 2 are provided in the surface of the silicon dioxide layer 7 not adjacent to the unstructured substrate 1. The four layers completing the structure are disposed on the grooved silicon dioxide layer 7. Four layers are provided with the same specification and in the same sequence as described above in connection with FIG. 2.

Figure 3B:
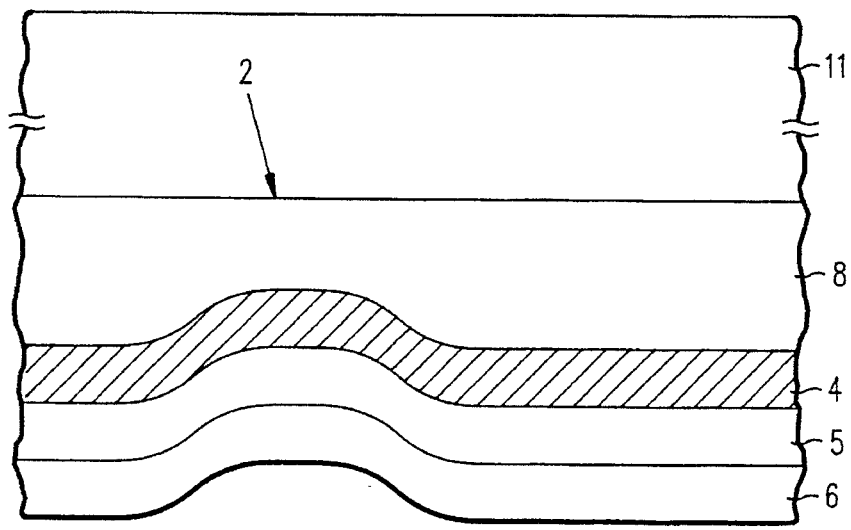
FIG. 3B is the same diagram as in FIG. 3A showing another embodiment.

FIG. 3B is the same diagram as in FIG. 3A showing another embodiment in which a dielectric layer 8 is disposed on the plane surface of an unstructured substrate 11. The grooves 2 are provided in the surface of the dielectric layer 8 not adjacent to the unstructured substrate 11. The dielectric layer 8 contains various combinations of the oxides $SiO_2$, $La_2O_3$, $PbO$ and $TiO_2$ and replaces the dielectric layer structure of the embodiment of FIG. 3A consisting of a $SiO_2$-layer and an AlN-layer.

The refractive index D and the signal-to-noise ratio (SNR) of the structure are enhanced in dependence of the thickness d of the dielectric layer. This is of special importance when the structure is used for optical disks. Receiving these results with only one dielectric layer using the above described composition additionally reduces the complexity of the manufacturing process and the process costs.

Three layers, a magneto-optic layer 4, a reflector layer 5 and a passivation layer 6 complete the structure and are disposed on the grooved dielectric layer 8. These three layers have the same specification and are disposed in the same sequence as described above in connection with FIG. 2.

Figure 3C:
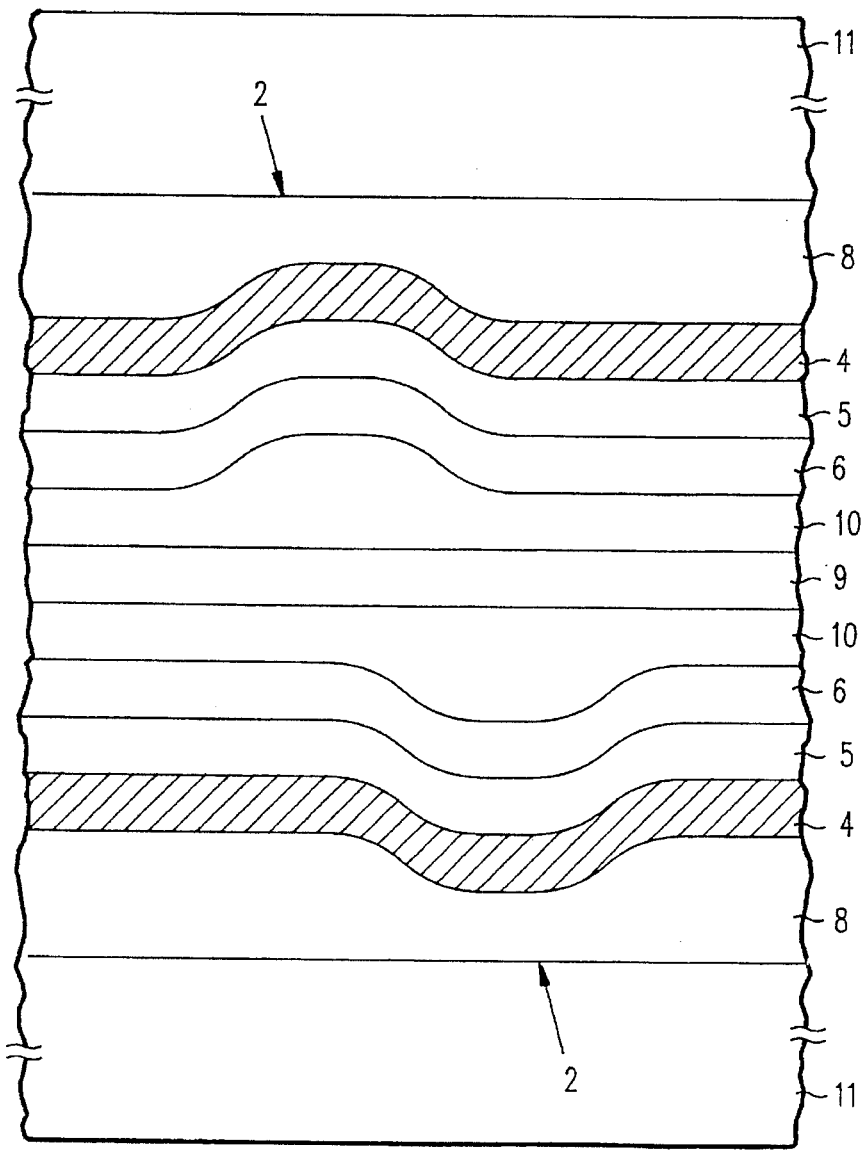
FIG. 3C is a schematic diagram showing the cross-section of one embodiment with two multilayer structures attached to each other.

FIG. 3C shows the cross-section of an embodiment with two multilayer structures attached to each other, e.g. by gluing, allowing at the same time the use of both sides of the structure to read or write information. An adhesive layer 9 sandwiched between protective layers 10 links the two multilayer structures.

Figure 4:
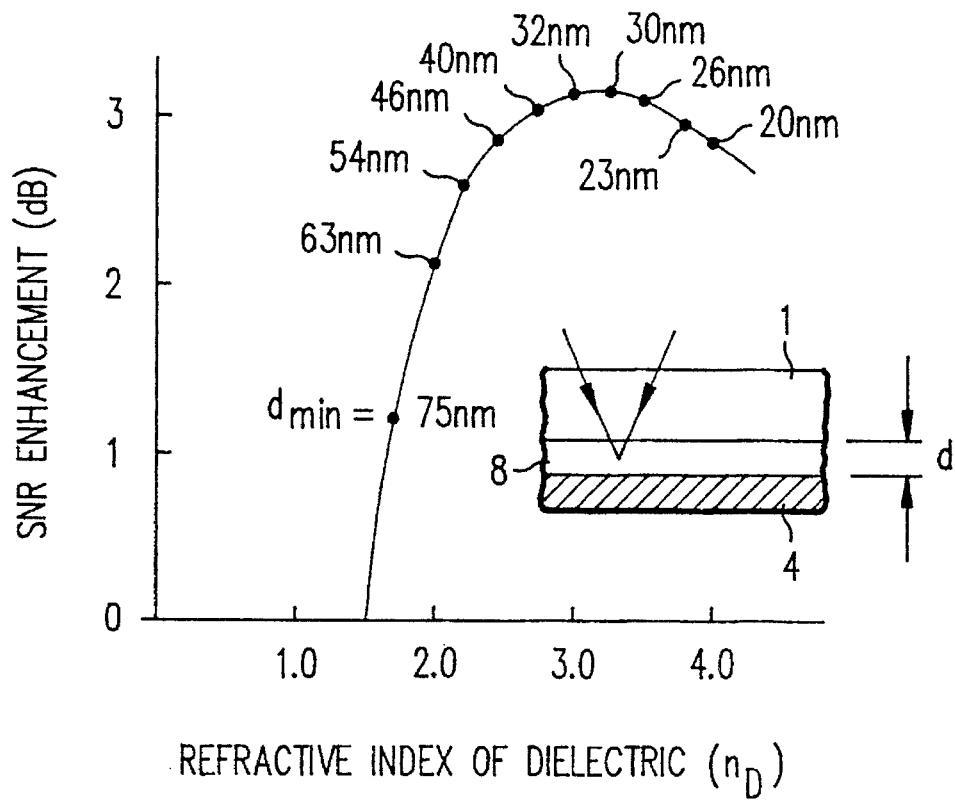
FIG. 4 is a diagram explaining the enhancement of signal-to-noise ratio and refractive index dependent on the dielectric layer thickness.

The enhancement of the signal-to-noise ratio and the refractive index in dependence of the thickness of the dielectric layer is shown in FIG. 4 published in Antireflection Structures for Magneto-Optic Recording, OSA Technical Dig est Series, Vol. 10, p. 138–9, 1987. The grooves in the embodiments described in FIGS. 3A and 3B may be manufactured following the process steps of the invention:

Spin coating of a supporting plate (1) with dissolved material forming a soft layer (7) on said supporting plate (1), stamping grooves (2) into said soft layer with a stamp, wherein said stamp shows the negative image of the structure to be transmitted to said soft layer (7), thus forming a structured soft layer (7), hardening of said structured soft layer (7) to transform said structured soft layer (7) into a hard, structured layer (7), wherein said hardening is accomplished by thermal treatment, wherein said dissolved material further contains controlling compounds which control the viscosity of said layer during the process steps of spin coating and of stamping grooves, wherein said controlling compounds comprise ethylene glycol.

To those skilled in the art it will be obvious that this process to manufacture grooves in a substrate could equally be well adapted to other articles which have a microstructure which must be accurately formed on the surface of plate like diffraction gratings or fresnel lenses.

Figure 5:
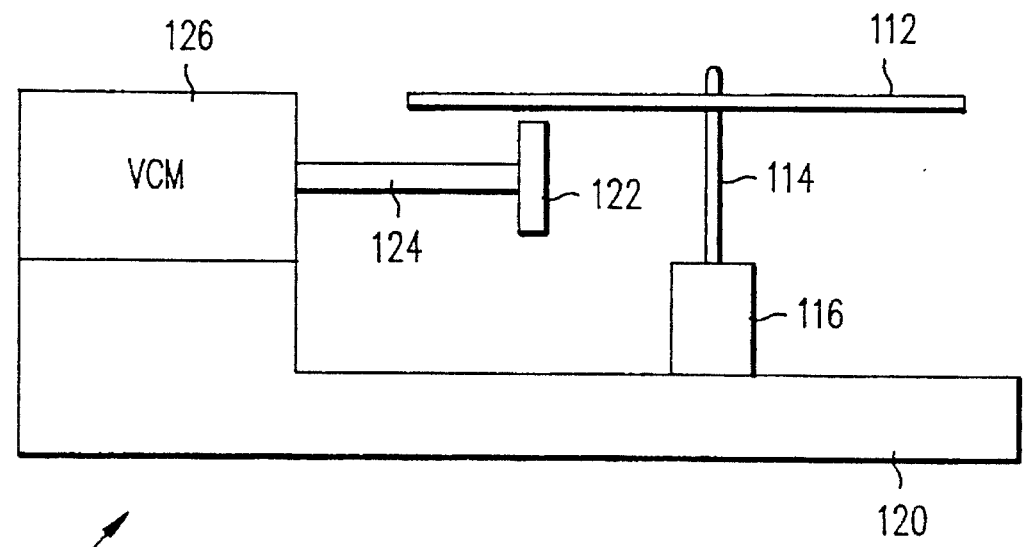
FIG. 5 is a schematic diagram showing a multilayer structure optical data storage system of the present invention.

FIG. 5 shows a schematic diagram of a multilayer structure optical data storage system of the present invention and is designated by the general reference number 110. System 110 includes an optical data storage medium 112 which is preferably disk-shaped. Medium 112 may be made of the multilayer structure shown in FIGS. 3A, 3B or 3C. Medium 112 is mounted on a spindle 114. Spindle 114 is attached to a spindle motor 116 which in turn is attached to a system chasis 120. Motor 116 rotates spindle 114 and medium 112.

An optical head 122 is positioned below medium 112. Optical head 122 directs a laser beam to the medium 112 for purposes of writing and reading data to or from the medium 112. Head 122 is attached to an arm 124 which in turn is connected to an actuator, such as a voice coil motor 126. Voice coil motor 126 is attached to chasis 120. Motor 126 moves arm 124 and head 122 in a radial direction below medium 112 such that a desired track on the medium 112 may be accessed.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A process for manufacturing a grooved substrate comprising the steps of:

spin coating a supporting plate with dissolved material forming a soft layer on said supported plate;

stamping grooves into said soft layer with a stamp wherein said stamp shows a negative image of a structure to be transmitted to said soft layer thus forming a structured soft layer;

hardening said structured soft layer to transform said structured soft layer into a hard structured layer wherein said hardening is accomplished by thermal treatment; and characterized in that said dissolved material contains polymeric organometal compounds.

2. The process of claim 1, wherein said dissolved material further contains controlling compounds which control the viscosity of said layer during the process steps of spin coating and of stamping grooves, wherein said controlling compounds comprise ethylene glycol.

3. The process of claim 1, wherein said stamping is carried out at room temperature.

4. The process of claim 1, wherein said stamping is carried out at a stamping pressure of approximately 1–6 bar.

5. The process of claim 1, wherein said stamp is coated with a thin carbon layer.

6. The process of claim 5, wherein the thickness of the carbon layer is approximately 0.4 µm.

7. The process of claim 1, wherein said stamp is separated from the substrate after completion of the stamping step by heating the stamp to about 130° C.

8. The process of claim 1, wherein said hardening by thermal treatment is carried out at approximately 400° C.

9. The process of claim 8, wherein said hardening by thermal treatment is carried out for approximately 1 hour.

10. The system of claim 1, wherein the polymeric organometal compounds comprise polymer siloxane.

11. The system of claim 1, wherein the polymeric organometal compounds comprise silsesquioxane.

12. The system of claim 1, wherein the polymeric organometal compounds comprise polymeric titanate.

13. The system of claim 1, wherein the polymeric organometal compounds comprise polymer silicate.

14. The system of claim 1, wherein the polymeric organometal compounds comprise phosphosilicate.

15. The system of claim 1, wherein the polymeric organometal compounds comprise phosphosiloxane.

* * * * *